(12) United States Patent
Larkin

(10) Patent No.: US 6,401,382 B2
(45) Date of Patent: Jun. 11, 2002

(54) FISHING APPARATUS

(76) Inventor: Raymond D. Larkin, Rt. 1 Box 877, Eucha, OK (US) 74342

( * ) Notice: Subject to any disclaimer, the term of this patent is extended or adjusted under 35 U.S.C. 154(b) by 0 days.

(21) Appl. No.: 09/846,925

(22) Filed: Apr. 30, 2001

Related U.S. Application Data

(63) Continuation-in-part of application No. 09/633,072, filed on Aug. 4, 2000, now abandoned.
(60) Provisional application No. 60/149,213, filed on Aug. 16, 1999.

(51) Int. Cl.$^7$ ............................................... A01K 93/00
(52) U.S. Cl. ............................ 43/43.11; 43/4; 43/43.1
(58) Field of Search ........................ 43/4, 43.1, 43.11, 43/44.87, 44.9, 44.91, 44.94

(56) References Cited

U.S. PATENT DOCUMENTS

| | | | | |
|---|---|---|---|---|
| 779,937 A | * | 1/1905 | Holt | 43/43.11 |
| 1,175,968 A | * | 3/1916 | Meiners | 43/43.11 |
| 1,804,084 A | | 5/1931 | Blake | 43/43.1 |
| 2,070,514 A | | 2/1937 | Marlow | 43/43.1 |
| 2,255,853 A | | 9/1941 | Makus et al. | 43/44.87 |
| 2,547,308 A | | 4/1951 | Dean | 43/44.87 |
| 2,784,515 A | * | 3/1957 | McBride et al. | 43/44.91 |
| 2,791,060 A | | 5/1957 | Kender | 43/44.9 |
| 2,924,039 A | * | 2/1960 | Morton | 43/43.11 |
| 3,010,238 A | * | 11/1961 | Crumrine, Jr. et al. | 43/43.11 |
| 3,216,146 A | * | 11/1965 | Johnson et al. | 43/43.11 |
| 3,273,278 A | | 9/1966 | Lynch | 43/44.87 |
| 3,577,669 A | * | 5/1971 | Johnson et al. | 43/43.11 |
| 3,657,837 A | * | 4/1972 | Price et al. | 43/43.1 |
| 4,484,405 A | * | 11/1984 | Woods | 43/43.1 |
| 4,561,205 A | | 12/1985 | Kessler | 43/4.5 |
| 4,569,146 A | * | 2/1986 | Lowrance et al. | 43/4 |
| 4,571,878 A | * | 2/1986 | Nyman | 43/43.11 |
| 4,607,449 A | * | 8/1986 | Brachear | 43/43.11 |
| 4,727,676 A | | 3/1988 | Runyan | 43/43.1 |
| 4,825,580 A | * | 5/1989 | Gray | 43/43.1 |
| 4,858,369 A | * | 8/1989 | Collins | 43/43.1 |
| 5,033,225 A | * | 7/1991 | Waldroop et al. | 43/43.11 |
| 5,048,219 A | * | 9/1991 | Georgescu | 43/4 |
| 5,161,324 A | * | 11/1992 | Dorsey | 43/44.9 |
| 5,207,013 A | * | 5/1993 | Bartok et al. | 43/43.1 |
| 5,235,776 A | | 8/1993 | Backus | 43/43.11 |
| 5,253,445 A | * | 10/1993 | Spoonemore | 43/43.11 |
| 5,265,369 A | * | 11/1993 | Botkins | 43/43.11 |
| 5,784,829 A | | 7/1998 | Latta | 43/44.91 |
| 5,819,465 A | * | 10/1998 | Bryant | 43/43.11 |
| 6,029,391 A | * | 2/2000 | Holley et al. | 43/43.11 |
| 6,092,325 A | * | 7/2000 | Walker | 43/43.11 |
| 6,321,481 B1 | * | 11/2001 | Presnell | 43/43.1 |

FOREIGN PATENT DOCUMENTS

| | | | | |
|---|---|---|---|---|
| GB | 683430 B1 | * | 11/1952 | 43/44.87 |
| GB | 2244196 | | 11/1991 | |
| JP | 5137488 | | 6/1993 | |

* cited by examiner

Primary Examiner—Darren W. Ark
(74) Attorney, Agent, or Firm—William R. Sharp

(57) ABSTRACT

A fishing apparatus is provided which overcomes a number of disadvantages with the conventional "jug line" used in jug fishing. The fishing apparatus includes an elongated cylindrical float of a pliable, resilient, and buoyant material. The float has a longitudinal axis and longitudinally spaced first and second ends. An eye is fixedly secured to the first end of the float, and a fishing line has an end attached to the eye. At least one hook is attached to the fishing line at a position spaced from the end of the fishing line. A counterweight is embedded in the second end of the float to assist in maintaining the float in a horizontal position before a fish strikes. The float assumes a vertical position when a fish is caught.

11 Claims, 3 Drawing Sheets

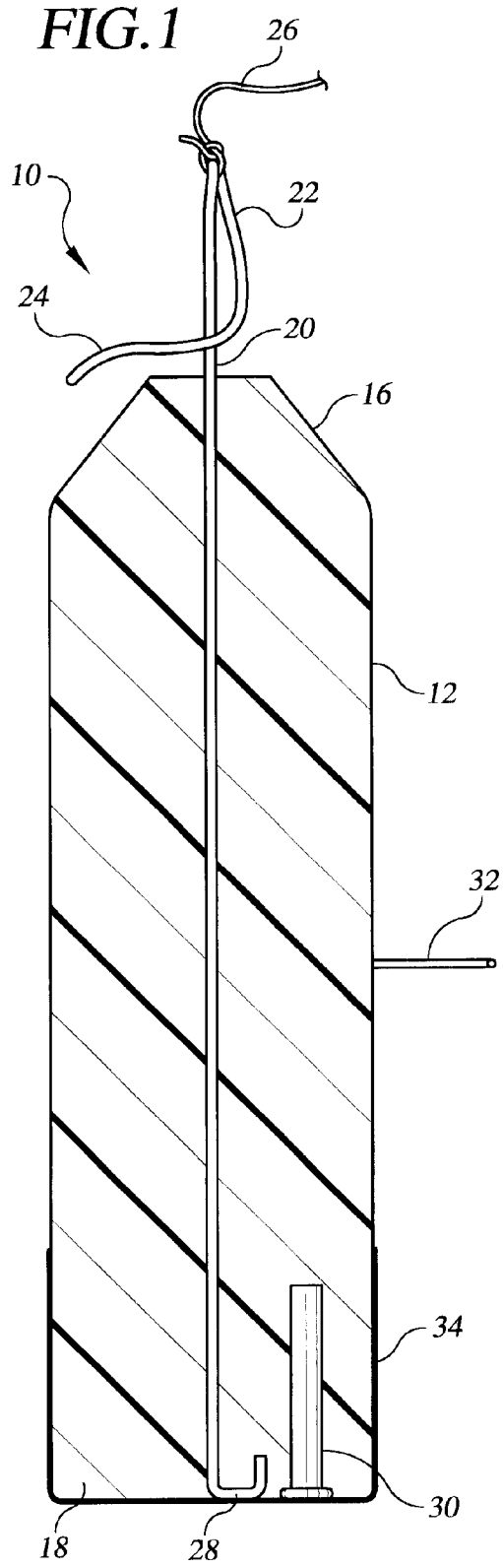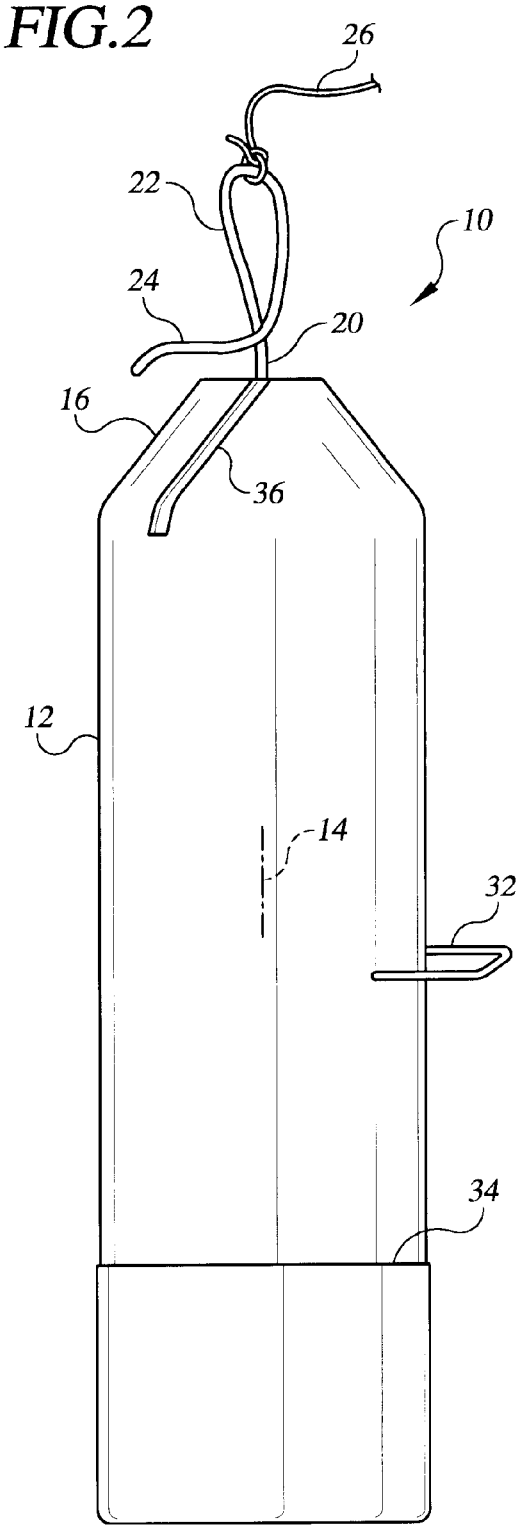

FIG.3
FIG.4
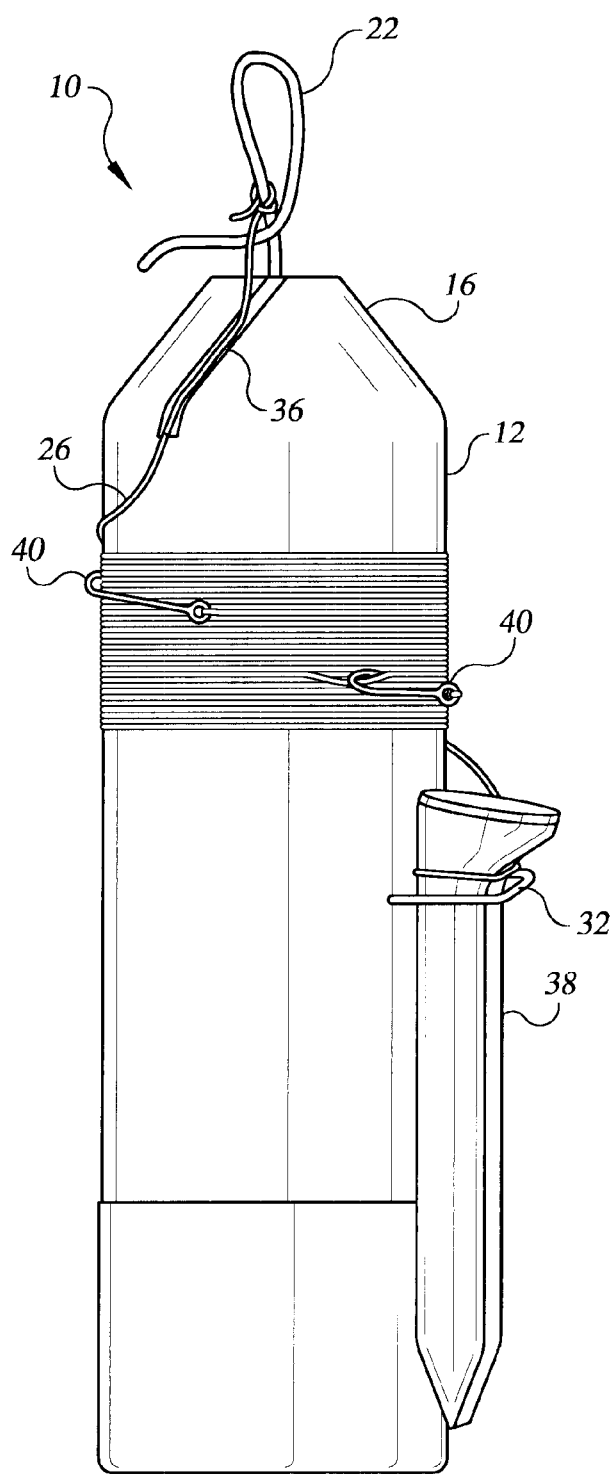
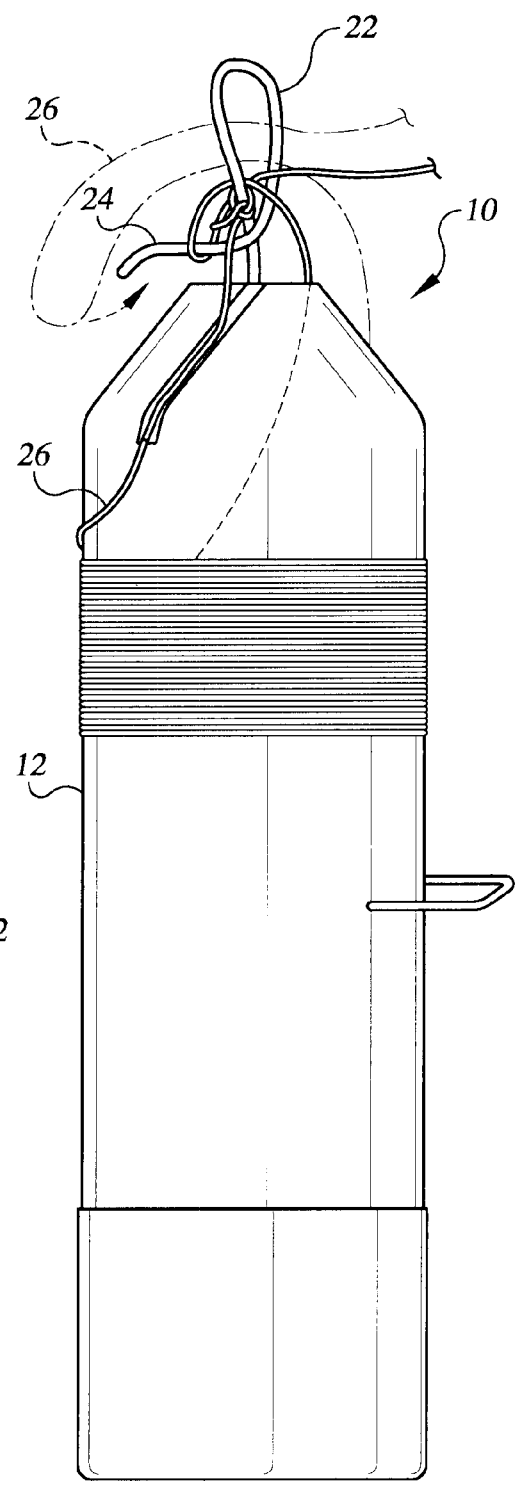

FIG.5
FIG.6
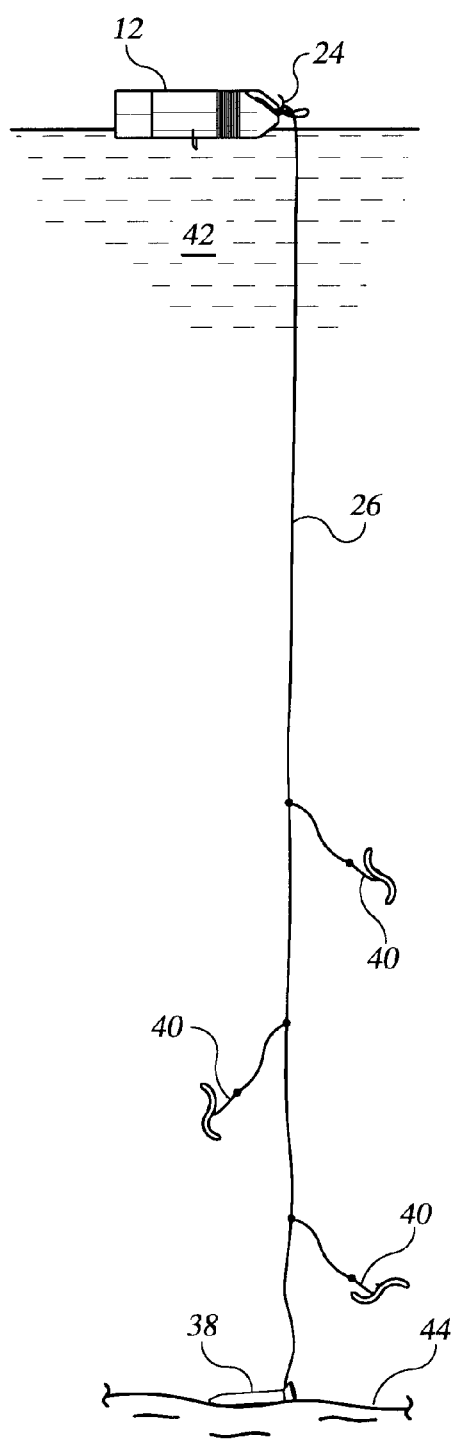
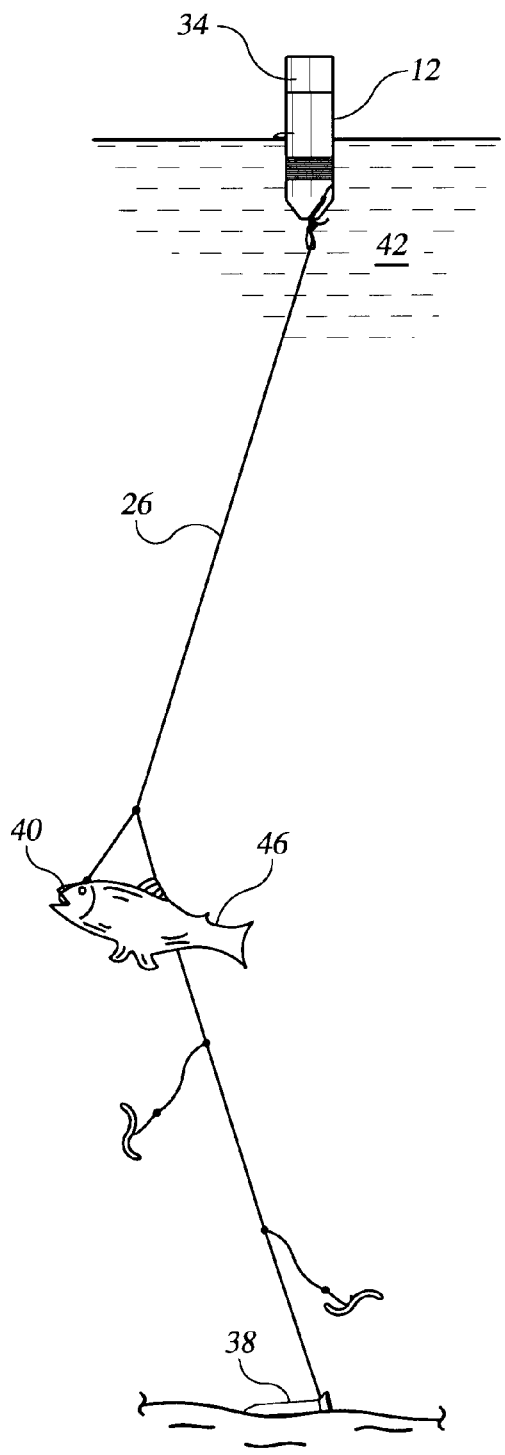

FISHING APPARATUS

CROSS-REFERENCE TO RELATED APPLICATIONS

This application is a continuation-in-part of U.S. application Ser. No. 09/633,072, filed Aug. 4, 2000 now abandoned, which claims the benefit of U.S. Provisional Application No. 60/149,213, filed Aug. 16, 1999.

BACKGROUND OF THE INVENTION

The invention relates to a fishing apparatus which is an improvement on the well known "jug line".

As used in a common fishing technique known as jug fishing, a jug line comprises a baited fishing line tied to an empty and buoyant plastic jug of the type used for containing fluids such as bleach, oil, insecticide, and antifreeze. The jug line is placed in the desired location in a body of water, and can be left unattended for a period of time. The fisherman comes back later to retrieve any hooked fish and/or to rebait the hooks.

There are a number of problems with the conventional jug line, including its potential as an environmental hazard. As noted above, the jug employed often has been emptied of a toxic fluid. However, the fisherman frequently does not thoroughly clean the empty jug. If the jug is left unattended for a long period of time, it may become damaged and fill with water. The contaminated jug will then sink to the bottom so as to release contaminants into the water. Moreover, the plastic of the jug will generally not degrade for a very long time. For these reasons, conventional jug lines are now illegal in certain locations.

Bobbing of the jug in the water is usually taken to indicate that a fish is on the line. However, waves created by wind or boat traffic can also cause the jug to bob, thus making it difficult to determine if a fish has actually been caught. The conventional jug line is also inconvenient insofar as it is hard to store. The unsecured fishing line often becomes tangled, and the loose and dangling hooks can snag the carpet of the boat, life preservers, clothing, etc. In addition, the conventional jug line has no convenient means of setting the line at a depth the fisherman wishes to fish.

SUMMARY OF THE INVENTION

It is, therefore, an object of the invention to provide a fishing apparatus that can be used for the same purpose as the conventional jug line, but which overcomes the previously discussed disadvantages of such a jug line.

As will become apparent in a preferred embodiment of the invention hereafter described, the above-mentioned object is realized by a fishing apparatus comprising: an elongated cylindrical float of a pliable, resilient, and buoyant material, the float having a longitudinal axis and longitudinally spaced first and second ends; an eye fixedly secured to the first end of the float; a fishing line having an end attached to the eye; at least one hook attached to the fishing line at a position spaced from said end of the fishing line; and a counterweight embedded in the second end of the float.

BREIF DESCRIPTION OF THE DRAWINGS

FIG. 1 is a cross-sectional view of a portion of the fishing apparatus in accordance with a preferred embodiment.

FIG. 2 is a side view of that portion of the apparatus shown in FIG. 1, but rotated slightly to show certain details more clearly.

FIG. 3 is a side view of the fishing apparatus as oriented in FIG. 2 showing all features of the invention as they typically appear when the apparatus is stored and not in use.

FIG. 4 is a side view of the fishing apparatus ready for use in fishing.

FIGS. 5 and 6 show the fishing apparatus in use.

DESCRIPTION OF A PREFERRED EMBODIMENT

Referring to FIG. 1 in conjunction with FIG. 2, fishing apparatus 10 includes an elongated cylindrical float 12 having a longitudinal axis 14 and longitudinally spaced ends 16 and 18. As shown, end 16 is preferably tapered or cone shaped. Float 12 is solid insofar as not being hollow, and is made of a pliable, resilient, and buoyant material. Such material is preferably a plastic foam, such as an extruded, low density, closed cell polyethylene foam.

The polyethylene foam is "low" in density by preferably having a density of about 1–3 pounds per cubic foot, most preferably less than 2 pounds per cubic foot. In addition to being pliable, resilient, and highly buoyant, this polyethylene foam resists water absorption, has superior tensile strength, and is nontoxic. The material's strength makes it very unlikely to break up in the water. Even if float 12 were to break into pieces, such pieces would continue to float rather than sinking to the bottom as with conventional jug lines. Because of this feature and its nontoxicity, a float of the preferred polyethylene foam presents virtually no hazards to the environment, and would meet legal requirements in most if not all locations. The polyethylene foam can be manufactured with various performance modifiers or additives, such as a suitable polyolefin elastomer to optimize pliability and resiliency. These properties not only contribute to the material's durability, but make it very suitable for removably receiving hooks when the apparatus is stored, as will be explained later. One manufacturer of the preferred polyethylene foam is Nomaco Inc. of Zebulon, N.C., who makes large quantities of the foam in cylindrical form for use in pool toys sold under various trademarks including the term "noodle". Of course, other materials and plastic foams are within the scope of the invention, including expanded polystyrene.

As noted above, float 12 is elongated and cylindrical. Preferably, float 12 has a length to diameter ratio of about 3:1–6:1. For example, float 12 could have a length of about 9–12 inches and a diameter of about 2–3 inches.

A rod 20, made of a strong metal such as brass or steel, is fixedly secured to and longitudinally extends from end 16 of float 12 so as to form an eye 22 adjacent to such end. As shown, rod 20 has an end 24 projecting approximately perpendicular to the longitudinal axis 14 of float 12 between end 16 thereof and eye 22. End 24 of rod 20 terminates in a tip that bends toward the end 16 of float 12. A fishing line 26 has an end tied to eye 22. Only a short length of fishing line 26 is shown in FIGS. 1 and 2. The remainder of fishing line 26 is shown in subsequent FIGURES. Fishing line 26 is preferably a heavy (i.e. 100 pound) monofilament line that is easy to handle and is not likely to tangle or form kinks. Such a heavy line is also advisable when fishing for potentially large fish, such as catfish.

Rod 20 extends through float 12 along its longitudinal axis 14 between its ends 16 and 18. Rod 20 further has an end 28 which is U-shaped and embedded in end 18 of float 12. Also embedded in such end 18 is a counterweight 30, which has a head and is elongated in the illustrated embodiment. Counterweight 30 extends into end 18 so as to be parallel to the longitudinal axis 14 of float 12. End 24 of rod 20 is shown as extending on one side of longitudinal axis 14, and counterweight 30 is positioned on the opposite side of such longitudinal axis. Counterweight 30 preferably has a weight of about 0.3–0.5 ounce, and can be made of any suitable material. Such material is most typically a metal.

A U-shaped clip 32 is embedded in and fixedly secured to float 12 between its ends 16 and 18. As shown, clip 32 extends outwardly from float 12. A suitably sturdy and preferably cloth based tape 34 encases end 18 of float 12. Tape 34 ensures that end 28 of rod 20 and counterweight 30 do not move out of their desired illustrated positions. The fisherman can also write, with a suitable permanent marker, his or her name, address, and phone number (not shown) on the circumferential portion of tape 34. Tape 34 is preferably colored to be highly visible. For example, white, red, blue, yellow, or green tape can be used, although white tape is most preferred for its visibility and for marking as noted above. With reference to FIG. 2 in particular, float 12 also has a channel or groove 36 at its end 16.

Referring to FIG. 3, showing fishing apparatus 10 as it is stored when not in use, a first end of fishing line 26 as tied to eye 22 is slipped down upon the eye as compared to its position in FIGS. 1 and 2. Fishing line 26 extends from such first end to channel 36, along and in which the line is received. Fishing line 26 extends from channel 36 so as to be wrapped in multiple loops around a portion of float 12 adjacent to end 16 thereof. From the coil thus formed, fishing line 26 extends to a second end, which is tied to an anchor weight 38. Anchor weight 38 is elongated and has an enlarged end so as to be received and held by clip 32 in the manner illustrated. The total length of fishing line 26 should be sufficient to allow fishing at any desired depth up to the maximum depth which is anticipated. A typical length is about 60 feet for most fishing applications.

A plurality of hooks 40 are attached to fishing line 26 between the ends of the line, such that they are spaced from the first end at eye 22 and are spaced from one another. The barbed portions of hooks 40 are embedded in or closely adjacent to that portion of float 12 which receives the coiled fishing line. The pliable and resilient material of float 12 is especially suited for storing hooks 40 in this manner. Although the illustrated embodiment has three hooks (only two of which are visible in FIG. 3), any number of hooks may be employed. The sizes of hooks 40 depend upon the type and size of fish the fisherman is trying to catch.

Accordingly, fishing apparatus 10 can be conveniently stored without the inconvenience and aggravation of tangled line or snagging of the hooks in clothing or other articles nearby.

Referring to FIG. 4, fishing apparatus 10 is shown with the hooks removed from float 12 and a length of fishing line 26 unwrapped from the float. In FIG. 4, only a small portion of fishing line 26 has been unwrapped from float 12 for fishing at a relatively shallow depth. The apparatus is easily and conveniently set for fishing at the predetermined depth (as shown in phantom lines) by forming a loop in fishing line 26, which is passed through eye 22 and then over end 24 of the rod, as indicated by the arrow. The resulting formation of fishing line 26 (as shown in solid lines) is thereby held in a fixed relationship to eye 12 by end 24. A broken line indicates a portion of fishing line 26 that extends behind float 12 to the coiled portion of the line. The bent tip of end 24 helps to ensure that the loop as received over such end does not slip off.

Although not shown, it should be readily apparent that fishing line 26 can be easily set at a greater depth, for example, by slipping the loop off of end 24, passing the loop back through eye 22, unwrapping more line from float 12, and then performing the same operation for resetting the line as described above. Or, to fish at a maximum depth, all of fishing line 26 can be unwrapped from float 12, in which case end 24 of the rod would not be used.

Referring to FIG. 5, float 12 is shown floating on the surface of a body of water 42 in its normal horizontal orientation before a fish strikes. Fishing line 26 is set at the illustrated depth in the manner shown in FIG. 4. Anchor weight 38 is resting on the bottom or floor 44 of the body of water for the purpose of anchoring float 12 at a desired location. Some slack is left in fishing line 26 so that anchor weight 38 does not pull on float 12. The three hooks 40 are shown in their spaced relationship and are baited to attract fish.

With reference back to FIG. 1 in conjunction with FIG. 5, the extremely light weight of the float material requires counterweight 30 at the end 18 of float 12 in order to counterbalance the weight of fishing line 26 and the baited hooks 40, thereby maintaining float 12 in the desired horizontal position. Furthermore, by positioning counterweight 30 as previously described relative to the longitudinal axis of float 12 and end 24 of the rod, this causes the float to orient itself with end 24 pointing upward as shown. This assists in preventing the loop of fishing line around end 24 (as described with reference to FIG. 4) from slipping off.

Referring to FIG. 6, float 12 is shown assuming a vertical position in water 42 after a fish 46 bites the bait on one of the hooks and pulls on fishing line 26. The colored tape 34 assists the fisherman in easily determining the vertical orientation of float 12, even at a considerable distance, thus indicating a fish has been caught.

Obviously, many modifications and variations of the present invention are possible in light of the above teachings. It is, therefore, to be understood that within the scope of the appended claims, the invention can be practiced otherwise than as specifically described.

That which is claimed is:

1. A fishing apparatus comprising:
   an elongated cylindrical float of a pliable, resilient, and buoyant material, the float having a longitudinal axis and longitudinally spaced first and second ends;
   a rod fixedly secured to and longitudinally extending from the first end of the float so as to form an eye adjacent thereto, the rod having a first end projecting approximately perpendicular to the longitudinal axis of the float between the first end of the float and the eye;
   a fishing line having an end attached to the eye;
   at least one hook attached to the fishing line at a position spaced from said end of the fishing line; and
   a counterweight embedded in the second end of the float.

2. A fishing apparatus as recited in claim 1 wherein the float is solid insofar as not being hollow.

3. A fishing apparatus as recited in claim 2 wherein said material is a plastic foam.

4. A fishing apparatus as recited in claim 3 wherein said material is a closed cell polyethylene foam.

5. A fishing apparatus as recited in claim 4 wherein the rod extends through the float along its longitudinal axis between its first and second ends.

6. A fishing apparatus as recited in claim 5 wherein the rod has a second end which is U-shaped and embedded in the second end of the float.

7. A fishing apparatus as recited in claim 6 wherein said end of the fishing line is the first end and the fishing line also has a second end, said at least one hook being attached to the fishing line between the first and second ends thereof, and wherein the fishing apparatus further comprises an anchor weight attached to the second end of the fishing line.

8. A fishing apparatus as recited in claim 7 wherein the anchor weight is elongated and has an enlarged end, and wherein the fishing apparatus further comprises a u-shaped clip fixedly secured to and extending outwardly from the float between said first and second ends of the float, the U-shaped clip being adapted to receive and hold the anchor weight when not in use.

9. A fishing apparatus as recited in claim 8 wherein said at least one hook comprises a plurality of hooks spaced apart from one another.

10. A fishing apparatus as recited in claim 9 wherein the first end of the rod extends on one side of the longitudinal axis of the float, and the counterweight is positioned on the opposite side of said longitudinal axis.

11. A fishing apparatus as recited in claim 10 wherein the counterweight is elongated and extends into the second end of the float so as to be parallel to the longitudinal axis of the float.

* * * * *